June 3, 1930.  A. L. BAUSMAN  1,761,065
CONFECTION MAKING MACHINE
Filed June 25, 1928  3 Sheets-Sheet 1
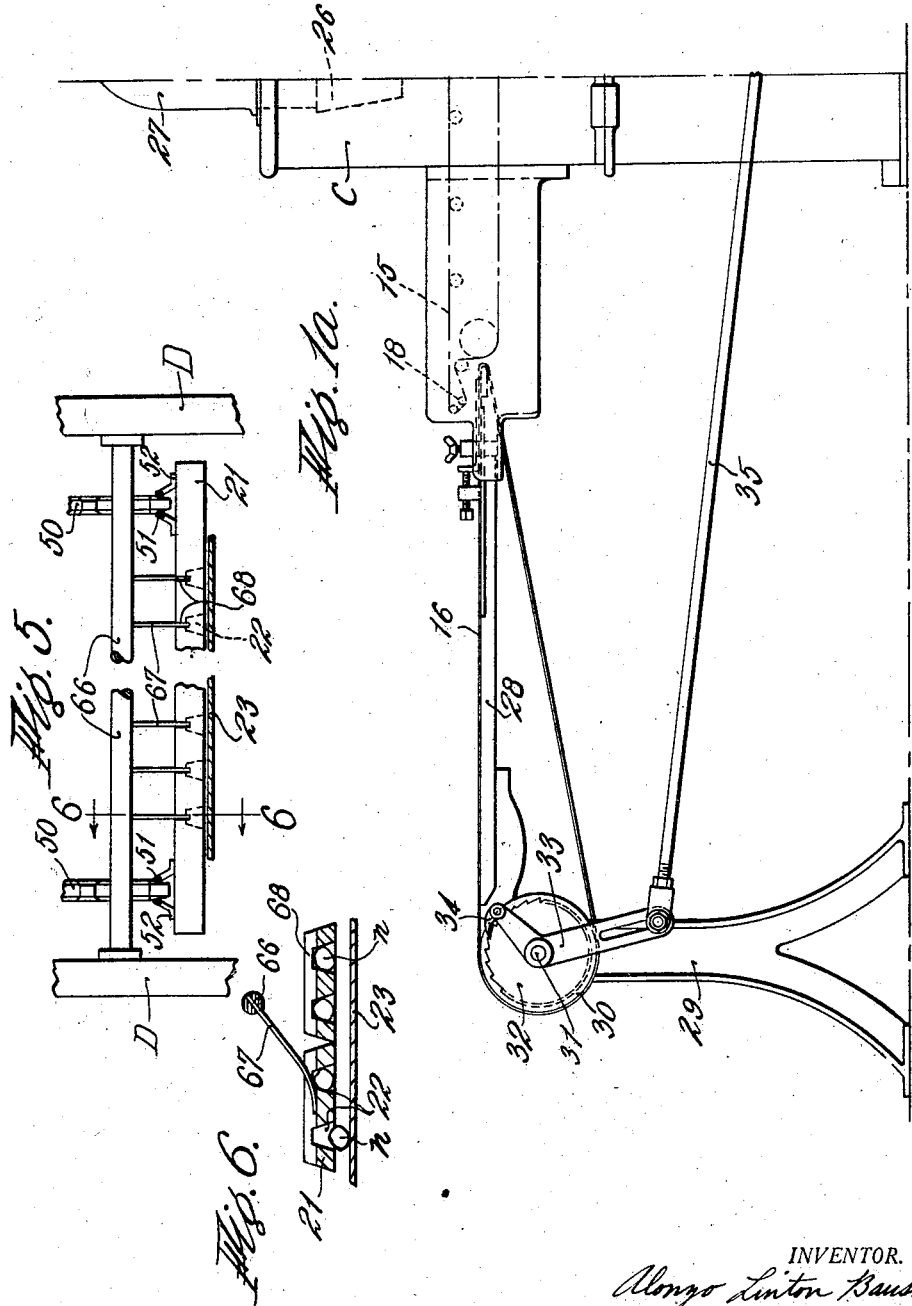
INVENTOR.
Alonzo Linton Bausman
BY Chapin + Neal
ATTORNEYS.

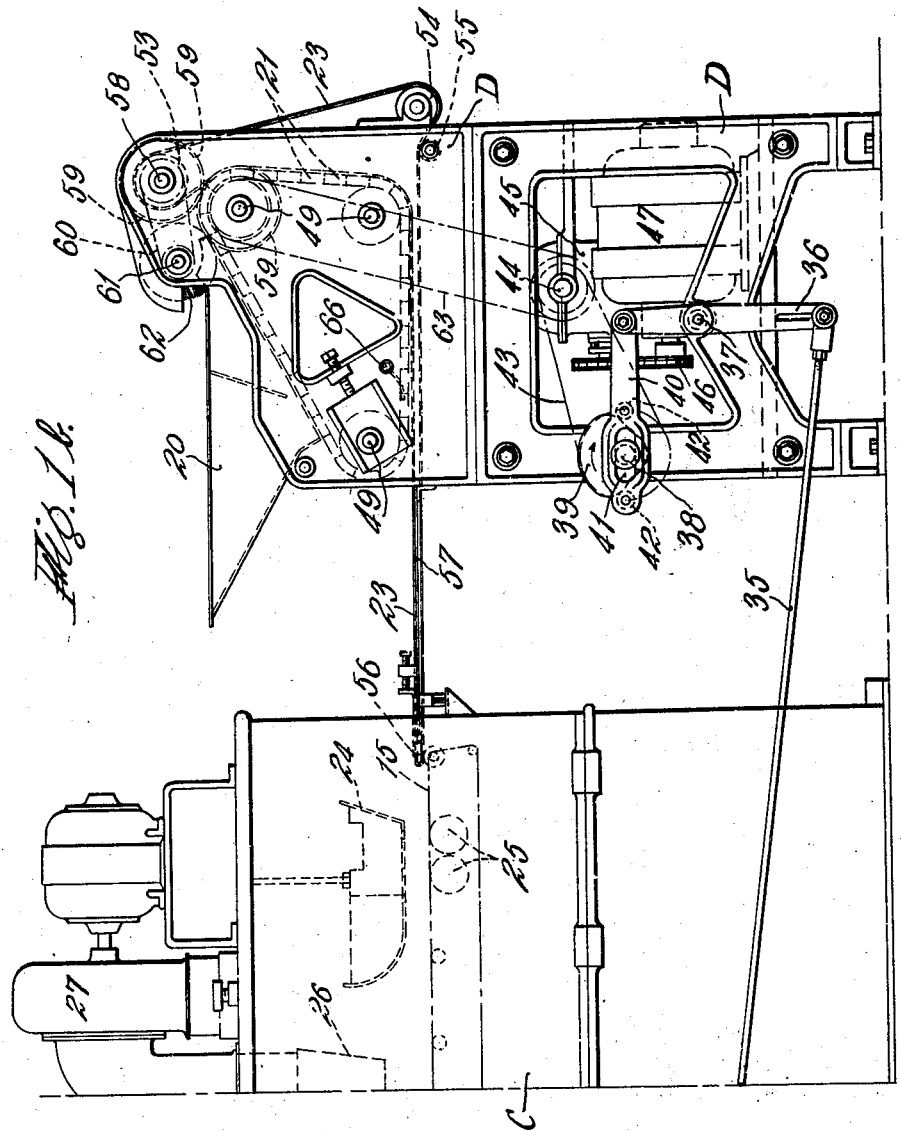

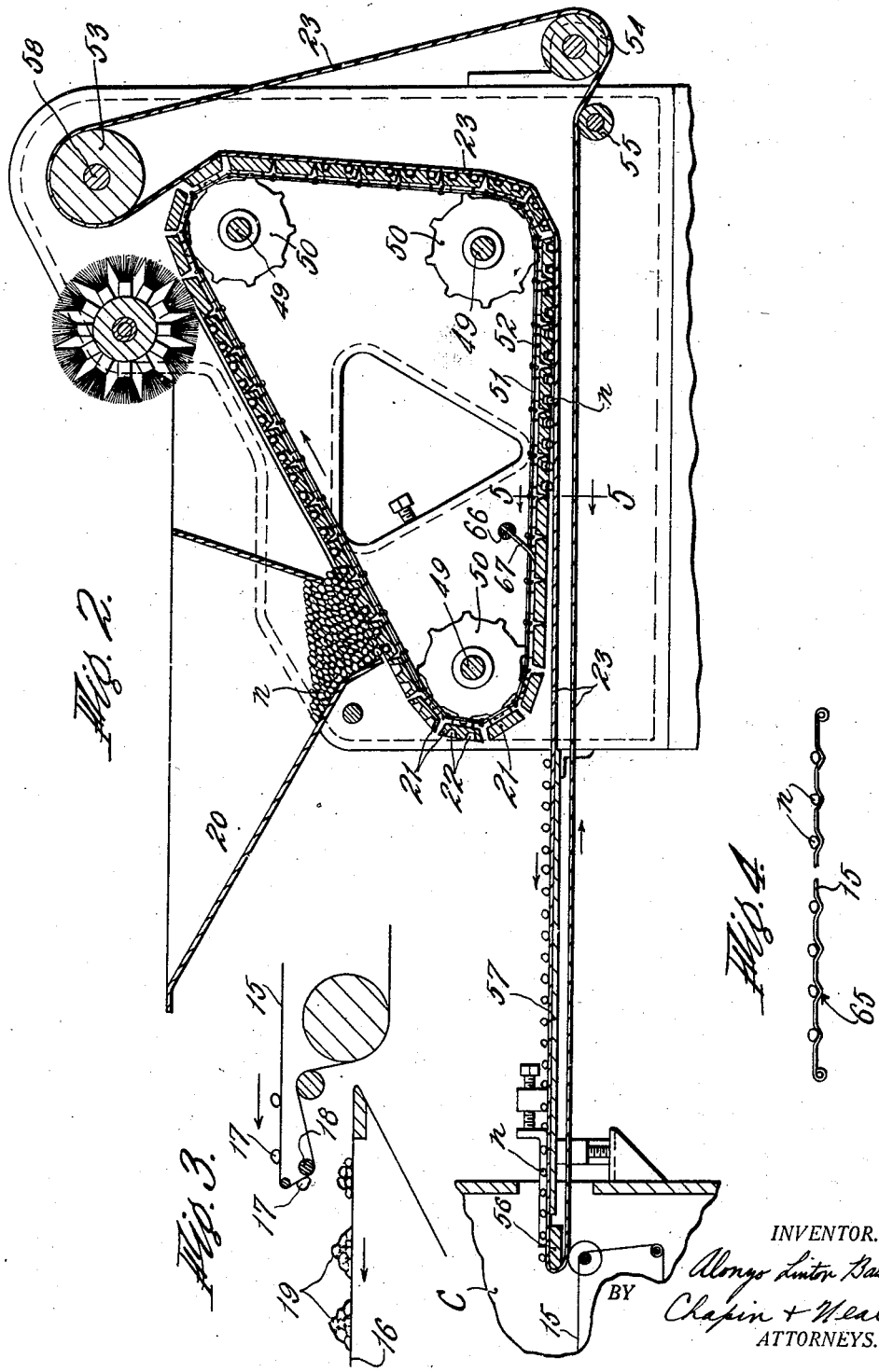

Patented June 3, 1930

1,761,065

UNITED STATES PATENT OFFICE

ALONZO LINTON BAUSMAN, OF SPRINGFIELD, MASSACHUSETTS

CONFECTION-MAKING MACHINE

Application filed June 25, 1928. Serial No. 288,275.

This invention relates to confection making machines and, more particularly, to an improved apparatus for making confection clusters.

A confection cluster consists of a number of edible pieces, such as nuts for example, which are bound together in a group by a suitable coating material, such as chocolate for example.

In making these clusters by machine, the method heretofore followed so far as I am aware, is to gather the constituent pieces into a group and then coat the group as one mass. For example, charges of nuts are placed in the pockets of the dipping basket of a dipping machine and the basket is then immersed in chocolate. In coating machines of the flooding type, cuff-like sleeves are placed on the endless wire belt and these sleeves are filled with nuts and then passed through the coating flow. In either case, the nuts have to be fed by hand and, in the latter case, additional manual operations are required to place and remove the sleeves which contain the confections,—the removal of such sleeves being also a very messy operation. Aside from these disadvantages, the former machines are apt to produce clusters, having bare spots which were not reached by the coating flow, and the coating is not uniform in thickness. Masses of chocolate will be found in some places and bare nuts in others. Chocolate is the expensive ingredient in nut clusters and, for economy, the ratio of chocolate to nuts should be cut down as low as possible. With the prior machines, one can seldom make clusters with less than fifty per cent of the product chocolate.

The general object of this invention is to provide an improved machine for making confection clusters which will enable a considerable saving in labor, over the former machines referred to, to be effected and which will produce better work with an economical but efficient utilization of the chocolate or other coating material.

A particular object of the invention is to provide means for individually coating the constituent pieces of each cluster and then successively dropping the coated pieces, while their coatings are still plastic, one upon another, forming a heap, the constituent elements of which are bound together by their coatings which merge together. In this way, each nut is thoroughly and uniformly coated and there will be no bare spots in the finished product. The chocolate is distributed more uniformly in the cluster and a better confection and one more attractive in appearance can be produced with less chocolate than was required by former methods.

Another object is to provide automatic means for counting out a predetermined number of nuts or the like, and feeding them successively to the belt of the coating machine in longitudinally spaced groups,—the constituents of each group being also longitudinally spaced,—and to provide in combination an intermittently movable delivery conveyer which remains stationary while the nuts of each group drop off the coating machine belt and which moves during the interval when no nuts are dropping off said belt.

Other objects and advantages will appear in the following description and will be pointed out in the appended claims.

The invention will be disclosed with reference to the accompanying drawings, in which:—

Figs. 1ª and 1ᵇ when joined together end to end, afford a complete side elevational view of an apparatus embodying the invention;

Fig. 2 is a sectional elevational view, drawn to a larger scale, of a mechanism for counting out the nuts and feeding them, properly spaced in groups, to the coating machine;

Fig. 3 is a diagrammatic view showing the way in which the coated nuts are formed into clusters;

Fig. 4 is a cross sectional view of the belt of the coating machine;

Fig. 5 is a fragmentary cross sectional view taken on the line 5—5 of Fig. 2; and Fig. 6 is a sectional elevational view taken on the line 6—6 of Fig. 5.

The general plan, which is followed in forming the cluster, is to individually coat in any suitable way, the desired number of nuts, or other pieces, which are to form the cluster, and to then gather together the coated pieces, while their coatings are still soft, into a compact group, so that the coatings of adjacent pieces of the group will merge and, when set, will bind the constituents of the group together.

The preferred way of accomplishing this result is shown conventionally in Fig. 3. There is shown the delivery end of a conveyer 15, which may be the wire belt of a coating machine C (Figs. 1ᵃ and 1ᵇ), and the receiving end of a conveyer 16, which receives freshly coated pieces 17, such as peanuts, for example, from conveyer 15. The arrangement is or may be generally similar to that disclosed in my U. S. Letters Patent No. 1,571,365, granted February 2, 1926, except that the conveyer 16 is moved in the illustrated direction intermittently by small steps, rather than continuously as in said patent. The freshly coated pieces 17 are, or may be delivered in the same general manner as in said patent,—being caused in any suitable way to drop from the lower stretch of belt 15 at a predetermined point in its travel. In this case, a roll 18 causes the belt 15, in the initial stage of its lower stretch of travel, to make a relatively sharp bend. The freshly coated pieces 17, clinging to the belt by reason of their plastic coatings, follow along with the belt as it commences its lower stretch of travel and are hanging upside down when they reach roll 18, at which time their hold on the belt is loosened as the belt bends around the roll. The pieces 17 are virtually peeled off the belt and drop upon the underlying belt 16. The coated pieces drop successively, as in the former patent, but the belt 16 is maintained stationary while a plurality of the coated pieces drop thereupon. The result is that the coated pieces pile up in a heap, as shown and since the coatings of these pieces are still soft, the various constituent pieces of the pile or group adhere and form a cluster, such as is shown at 19. When enough pieces have been dropped to form a cluster, the belt 16 is advanced one step to remove the finished cluster and leave a fresh space for the formation of another cluster. The finished clusters are successively transferred by belt 16 to a suitable delivery point, such as a cold room or a cooling apparatus, where the coating of the cluster is set or hardened in any suitable manner.

It is desirable, although not necessarily essential for all purposes, to feed the nuts in groups to the confection coating machine C in such a way that there will be no nuts delivered from belt 15 upon belt 16 during the intervals in which the latter moves. One illustrative example of a feeding mechanism suitable for this purpose is shown in Fig. 2. The nuts n, or other pieces, are contained in a hopper 20, the bottom of which is closed by a slat conveyer moving therebeneath. Certain of the slats 21 of this conveyer have pockets 22 therein, which become filled with nuts from hopper 20 while the conveyer is travelling in its upper and upwardly inclined stretch. Other slats of the conveyer are devoid of pockets. The slat conveyer travels in the direction of the arrow, first in an upwardly inclined path for filling, then in a downward course and finally in a substantially horizontal course towards the confection coating machine C. A belt 23, which may as shown, be also utilized to advantage as a feed belt, travels at the same speed as the slat conveyer and in one stretch presses against the outer faces of the slats to prevent escape of the nuts during the downward travel of the slats. The belt 23 also travels forwardly in underlying relation with the lower stretch of the slat conveyer for the same purpose but gradually separates therefrom with the result that the nuts drop out of the pockets upon belt 23. The belt 23 carries the nuts, now spaced and grouped, forwardly to, and allows them to drop successively on, the belt 15 of the coating machine.

In the example shown, the slat conveyer is made up of thirty-six slats. There are two groups of twelve slats each, and each such slat has two pockets 21 therein. Between each group of pocketed slats are six blank slats. The result is that the nuts will be fed in groups of twenty-four to belt 23 with the units of each group equally and longitudinally spaced on the belt and with a space between successive groups due to the slats which are devoid of pockets. The nuts, thus spaced on belt 23, drop successively on belt 15 of the coating machine and, since both belts move continuously, the nuts will be spaced and grouped on belt 15 in a similar manner. The belts 15 and 23, however, do not necessarily travel at the same speed and, therefore, the spacing between successive nuts of a group or between successive groups is not necessarily the same on belt 15 as on belt 23 and may be greater or less accordingly as belt 15 travels faster or slower than belt 23.

The belt 15 carries the nuts beneath a shower pan 24 (Fig. 1ᵇ) from which one or more vertical streams of chocolate issue, and also over two bottom coating rolls 25. Each nut is coated in part by such streams and in part by chocolate forced up through belt 15 by rolls 25, all in the usual and known manner. As the nuts are carried along, they pass below the nozzle 26 of a fan 27 and the blast of air which issues from this nozzle removes superfluous coating in the known and usual way. It is common practice to control the thickness of the chocolate coating by varying the air blast from nozzle 26 and thus by varying the amount of coating which is removed from the articles. Thus, since the standard coating machine is utilized in the usual way to coat articles, the thickness of the coating may be varied and controlled in the usual way. The nuts, after having been completely coated, drop successively from belt 15 and pile up on belt 16, as above described to form the clusters. As soon as the last nut of a group has dropped free of belt 15 to complete the cluster, the belt 16 is advanced one step and no nuts are delivered during the interval while belt 16 is in motion.

Referring now to the details of the exemplary apparatus, the coating machine C as shown, is of the general type disclosed in my prior U. S. Letters Patent No. 1,323,948, granted December 2, 1919, to which reference is made for a more complete disclosure of the construction and of the manner in which the coating operation is effected. The machine of said patent is modified according to the teachings of Patent No. 1,571,365 with respect to the arrangement of the delivery end of belt 15, although the roll of the last named patent which is utilized to cause the confections to drop is arranged above the lower stretch of belt 15 rather than below it and also in such a way as to cause the bend in belt 15 which has been described in connection with Fig. 3. The roll 18 of Fig. 3 may be vibrated as shown in connection with the roll 48 of the last named patent. The driving mechanism for the coating machine is sufficiently disclosed in said patents so that detailed description here is unnecessary.

The delivery belt 16, as shown in Fig. 1ª, travels over a table 28, which is supported at one end by a standard 29 and at the other from the frame of machine C, in the usual manner. In the standard is mounted a roll 30, which drives belt 16, and to the shaft 31 of this roll is fixed a ratchet wheel 32. Free to turn on shaft 31 is a lever 33, one end of which carries a pawl 34 for moving the ratchet. This lever is connected by a link 35 to the lower end of a lever 36 (Fig. 1ᵇ) which is pivoted at 37 to one of a pair of frames D, supporting the nut feeding mechanism. Also mounted in frames D is a drive shaft 38 on one end of which is fixed a cam 39. A link 40, pivotally connected at one end with lever 36, is slotted as at 41, to slide on shaft 38 and carries two rolls 42 which engage the periphery of cam 39 at diametrically opposite points. Cam 39 is so constructed as to cause pawl 34 to advance and move its ratchet 32, and thus roll 30 and belt 16, in one-sixth of a revolution. It then causes the pawl to dwell through the next succeeding one-third revolution. In the next succeeding one-sixth revolution, pawl 34 is retracted after which it is caused to dwell for the remaining one-third of its revolution. Shaft 38 is driven by a sprocket chain 43 from a shaft 44 which is driven through the intermediary of a suitable transmission indicated at 45, and a sprocket chain 46 from an electric motor 47 supported from frames D.

The nut feeding mechanism is supported from the side frames D in which three shafts 49 are mounted. Each of these shafts carries a pair of sprockets 50 (see Fig. 5) and a link belt chain 51 is trained over the several sprockets of each pair. Lugs 52, provided at intervals on each chain 51, are suitably attached to the base of slats 21. The belt 23 is trained over a driving roll 53, a tension roll 54, and an idler roll 55. It is also trained around the end of a plate 56, which is mounted for longitudinal adjustment in the usual manner on one end of a table 57. Such end of the table is supported for vertical adjustment from the frame of the coating machine in the usual manner, as indicated. The hopper 20 is supported from the side frames D. The shaft 58 of drive roll 53 is connected by intermeshing spur gears 59 with the adjacent shaft 49 to turn at equal speed. It is also connected by a sprocket chain 60 to drive the shaft 61 of a revolving brush 62, the purpose of which is to sweep back into the hopper 20 any nuts not lodged in pockets 22. The shaft 49 is driven by a sprocket chain 63 from the described shaft 44, and at a speed such as to move the slat conveyer a distance equal to half its length while cam 39 is making one complete revolution. Thus twelve pocketed slats and six blank slats will move by a given point during one revolution of the cam and thus during each feeding movement of belt 16. The timing of the feeding movement of belt 16, so that it occurs during the interval when no nuts are delivered from belt 15, is effected by adjusting the cam 39 circumferentially on its shaft.

The machine, as thus far described, has been treated as if but one row of nuts are fed. It is usual, of course, to feed a plurality of rows of centers to a coating machine and that is the case here, as will be evident from Fig. 5, which shows a transverse view of one of the slats 21 and a transverse row of pockets 21 provided therein. Also from Fig. 4, in which one of the cross wires of the belt 15 is shown, it will be evident that this belt is provided with a plurality of laterally spaced depressions 65 for receiving, and holding against transverse displacement, a plurality of rows of nuts.

It may be desirable to provide some means for insuring the removal of the nuts from pockets 22 and, as an example of one such means reference is made to Figs. 5 and 6. Here a cross bar 66 is shown as carrying a plurality of laterally spaced spring wires 67, one for each pocket of the transverse row in slat 21. Each slat has a plurality of longitudinal grooves 68 in its rear face, one for each of the wires 67. The grooves are deep enough to intersect the bases of the pockets 22 and, as each transverse row of pockets advances, the wires 67 will engage the nuts *n* therein, unless they have previously dropped out, and loosen them so that they will drop out and fall on belt 23 as planned.

The nut feeding mechanism described is illustrative of one suitable means for performing the desired functions. Any other suitable feeder may be used for the purpose as desired. The object, in the illustrated case, is accomplished by running the slat conveyer continuously and providing blank slats to create spaces between the groups of nuts. I have run the slat conveyer intermittently and eliminated all blank slats, which will yield the same result, but the continuous operation is usually desirable to avoid the vibration and jar due to sudden stopping and starting which might displace the nuts out of the desired longitudinally spaced positions on belt 23.

The belt 16 is preferably surfaced in such a way that chocolate will not adhere thereto. It may carry plaques as in my prior U. S. Letters Patent No. 927,928, dated July 13, 1909, or it may be a paper belt as in my prior U. S. Letters Patent No. 1,667,765 dated May 1, 1928. This belt 16 may carry the confections through a cold box as in the last named patent or it may merely carry them to a cold room where the confections are manually removed from the belt and laid on shelves until cooled.

The operation of the machine will sufficiently appear from the foregoing description.

It should be noted that the machine provides a means for making clusters automatically. The labor necessary in former machines in feeding and grouping the nuts has been eliminated and with it all necessity for any contact of operator's hands with the goods, or the constituent parts thereof, during the process of formation. The nuts, placed in bulk in hopper 20, are counted out into groups and fed in properly spaced relation both transversely and longitudinally to belt 23 without any attention on the part of the operator. The nuts are individually coated in the usual way which assures a complete and substantially uniform coating and of a thickness which can readily be controlled and which may be varied as desired. The chocolate coating may, if desired, be cut down almost to the point of just enough to bind the nuts of each cluster together. For example, clusters having seventy-five per cent nuts and twenty-five per cent chocolate have been made with the machine herein disclosed. Thus, a considerable economy in the use of chocolate may be effected by the use of my machine and at the same time the manual labor, heretofore necessary, and the other disadvantages incident to the prior machines are eliminated.

The invention has been disclosed herein, in an embodiment at present preferred, for illustrative purposes but the scope of the invention is defined by the appended claims rather than by the foregoing description.

What I claim is:

1. A machine for making confection clusters, comprising, an intermittently movable member on which the clusters are formed, means for individually coating the pieces which are to be formed into clusters, and means for successively delivering to and dropping upon said member during each interval of rest thereof a predetermined number of said coated pieces, whereby the several pieces pile up one upon another and adhere to form a cluster.

2. A machine for making confection clusters, comprising, means for individually coating the pieces which are to be formed into a cluster, an intermittently movable member on which the clusters are formed, and means for conveying the individually coated pieces and dropping them successively upon said member while their coatings are still plastic, whereby the coated pieces dropped upon said member while it is at rest pile up one upon another and adhere to form the cluster.

3. A machine for making confection clusters, comprising, a continuously movable conveyer, means for successively feeding thereto a series of pieces to be coated, means for coating said pieces while on said conveyer, and an intermittently movable conveyer having one end in receiving relation with and at a lower level than the delivery end of said conveyer, whereby the coated pieces which successively drop from the first conveyer upon the second conveyer while the latter is at rest, pile up one upon another and adhere to form a cluster.

4. A machine for making confection clusters, comprising an intermittently movable conveyer on which the clusters are successively formed and by which they are successively carried to a point of delivery, means for successively and individually coating pieces to be subsequently formed into clusters, and means for delivering the coated pieces in groups with an interval between successive groups, said means effective during each interval of rest of said conveyer to deliver one such group to and successively drop the pieces of such group upon said conveyer, whereby the pieces of the group pile up one upon another and adhere to form a cluster, and means for advancing said conveyer during the interval when no coated pieces are delivered by said last named means.

5. The combination with a confection coating machine having an endless belt and means for coating confections while on said belt, of a feed belt for delivering confections to said coating machine belt, means for automatically feeding the confections to said feed belt and arranging them thereon in groups disposed in a longitudinal row with the units of each group longitudinally spaced and with a larger longitudinal spacing between successive groups, a delivery belt on which the coated confections of each group successively fall, and means for holding the delivery belt stationary while the coated units of one group fall thereupon and for moving said belt during the interval between the falling of the last unit of one group and the first unit of the succeeding group from the coating belt.

6. The combination with a confection coating machine, of a feed belt for delivering confections to be coacted thereto, a conveyer having confection receiving pockets therein, and means for filling said pockets during that part of the course of travel of said conveyer in which the pockets travel open end up, said feed belt arranged in part of its course of travel in contiguous relation with said conveyer to close the filled pockets until they travel open end down and to then gradually separate from said conveyer, whereby the confections drop from the pockets upon said belt and are carried thereby to said coating machine.

7. The combination with a coating machine having a confection conveyer and means for coating confections while on said conveyer, of a feed belt therefor, a conveyer having a series of confection receiving pockets arranged at spaced intervals in its circuit, said series of pockets being followed by a larger interval in which the conveyer is devoid of pockets, means to fill said pockets with confections, the latter being carried by the pocketed conveyer to and transferred to said feed belt, and means for driving said pocketed conveyer and feed belt continuously, all constructed and arranged so that the confections are fed to said machine in groups with the units of each group spaced longitudinally and with a larger spacing between successive groups.

8. The combination with a confection coating machine, of a feed belt for delivering confections to be coated thereto, a conveyer having confection receiving pockets therein and also having a longitudinal groove intersecting the bases of the several pockets, means for filling said pockets during that part of the course of travel of said conveyer in which the pockets travel open end up, said feed belt arranged in part of its course of travel in contiguous relation with said conveyer to close the filled pockets until they travel open end down and to then gradually separate from said conveyer, whereby the confections drop from the pockets upon said belt and are carried thereby to said coating machine, and a spring member supported adjacent the pocketed conveyer so that its free end rides in said groove and successively loosens the confections from said pockets so that they may drop on said belt at the proper time.

9. In a confection coating machine, a conveyer which in its upper stretch of travel carries freshly coated confections and to which the latter cling as the conveyer passes to its lower stretch of travel, whereby the coated articles hang upside down from the conveyer as it enters its lower stretch of travel, conveying means in part underlying said last named stretch of the conveyer to receive the confections therefrom, and means located above said conveying means and above the last-named stretch of said conveyer to force it to make a sharp bend in the early part of its lower stretch of travel and thereby so loosen the hold of the confections that they drop from said conveyer at a predetermined point in its lower stretch of travel.

10. A machine for making confection clusters, comprising, a conveyer on which the clusters are formed, means for individually coating the pieces which are to be formed into clusters, a conveyer for successively delivering the coated pieces to the first conveyer, and means for periodically varying the speed of one of said conveyers to effect a relative retardation of the first conveyer with respect to the second conveyer and thereby enable a plurality of coated pieces to be grouped together on the first conveyer and form a cluster.

11. A machine for making confection clusters, comprising, a conveyer on which the clusters are formed, means for individually coating the pieces which are to be formed into clusters, a conveyer for successively delivering the coated pieces to the first conveyer, and means for periodically retarding the movement of the first conveyer to enable a plurality of coated pieces to be grouped together on the first conveyer and form a cluster.

In testimony whereof I have affixed my signature.

ALONZO LINTON BAUSMAN.